(12) United States Patent
Takasawa et al.

(10) Patent No.: US 9,604,432 B2
(45) Date of Patent: Mar. 28, 2017

(54) COATING STRUCTURE MATERIAL

(71) Applicant: THE JAPAN STEEL WORKS, LTD., Tokyo (JP)

(72) Inventors: Kouichi Takasawa, Muroran (JP); Eiji Maeda, Muroran (JP); Shinji Tanaka, Muroran (JP); Tatsuya Takahashi, Muroran (JP)

(73) Assignee: THE JAPAN STEEL WORKS, LTD., Tokyo (JP)

(*) Notice: Subject to any disclaimer, the term of this patent is extended or adjusted under 35 U.S.C. 154(b) by 0 days.

(21) Appl. No.: 14/430,339

(22) PCT Filed: Sep. 24, 2013

(86) PCT No.: PCT/JP2013/075769
§ 371 (c)(1),
(2) Date: Mar. 23, 2015

(87) PCT Pub. No.: WO2014/046289
PCT Pub. Date: Mar. 27, 2014

(65) Prior Publication Data
US 2015/0197071 A1    Jul. 16, 2015

(30) Foreign Application Priority Data

Sep. 24, 2012  (JP) ................. 2012-210214

(51) Int. Cl.
*B32B 15/01*    (2006.01)
*B23K 35/30*    (2006.01)
(Continued)

(52) U.S. Cl.
CPC ............ *B32B 15/01* (2013.01); *B23K 35/007* (2013.01); *B23K 35/30* (2013.01);
(Continued)

(58) Field of Classification Search
None
See application file for complete search history.

(56) References Cited

U.S. PATENT DOCUMENTS 4,659,632 A * 4/1987 Morikawa .......... B23K 35/3046
420/440
2003/0114916 A1   6/2003 Pinchasik
(Continued)

FOREIGN PATENT DOCUMENTS

CN    101117978 A    2/2008
CN    101775525 A    7/2010
(Continued)

OTHER PUBLICATIONS

International Search Report for PCT/JP2013/075769 dated Dec. 17, 2013 [PCT/ISA/210].
(Continued)

*Primary Examiner* — Daniel J Schleis
(74) *Attorney, Agent, or Firm* — Sughrue Mion, PLLC

(57) ABSTRACT

The invention is to provide a coating structure material excellent in Mg corrosion resistance, which has resistance to corrosion caused by molten Mg and molten Mg alloys. The invention relates to a coating structure material including an Ni—Co-base alloy substrate and a Co-base alloy coating layer formed on the Ni—Co-base alloy substrate, wherein the Co-base alloy coating layer contains, in terms of % by mass, Ni: 20% or less, Co: 42% or more, Si: 2.8% or less, and Fe: 3.5% or less.

7 Claims, 4 Drawing Sheets

(51) Int. Cl.
    *C22C 19/07*     (2006.01)
    *C22C 19/05*     (2006.01)
    *C22C 23/00*     (2006.01)
    *B23K 35/365*     (2006.01)
    *B23K 35/00*     (2006.01)

(52) U.S. Cl.
    CPC ........ *B23K 35/3046* (2013.01); *B23K 35/365* (2013.01); *C22C 19/055* (2013.01); *C22C 19/056* (2013.01); *C22C 19/07* (2013.01); *C22C 23/00* (2013.01); *Y10T 428/12931* (2015.01)

(56) References Cited

U.S. PATENT DOCUMENTS

| | | | |
|---|---|---|---|
| 2004/0098102 A1 | 5/2004 | Richter et al. | |
| 2006/0051234 A1* | 3/2006 | Pike, Jr. ................. | C22C 19/056 420/448 |
| 2006/0149359 A1 | 7/2006 | Richter et al. | |
| 2006/0222557 A1 | 10/2006 | Pike, Jr. | |
| 2010/0116383 A1* | 5/2010 | Cloue ...................... | C21D 1/74 148/675 |

FOREIGN PATENT DOCUMENTS

| | | |
|---|---|---|
| CN | 101946015 A | 1/2011 |
| EP | 2246449 A1 | 11/2010 |
| JP | 63-10097 A | 1/1988 |
| JP | 09-241868 A | 9/1997 |
| JP | 10-298683 A | 11/1998 |
| JP | 2862799 B2 | 3/1999 |
| JP | 2002-283030 A | 10/2002 |
| JP | 2003-311386 A | 11/2003 |
| JP | 2004-066240 A | 3/2004 |
| JP | 2004-066241 A | 3/2004 |
| JP | 2006-70360 A | 3/2006 |
| JP | 2008-309140 A | 12/2008 |
| JP | 2008309140 | * 12/2008 |

OTHER PUBLICATIONS

Written Opinion for PCT/JP2013/075769 dated Dec. 17, 2013 [PCT/ISA/237].
Extended European Search Report issued Jun. 9, 2016, by the European Patent Office in corresponding European Patent Application No. 13838716.2.
Communication issued Jul. 29, 2016, from the State Intellectual Property Office of the People's Republic of China in corresponding Chinese Patent Application No. 201380049652.8.
Communication issued Jan. 9, 2017, by the State Intellectual Property Office of the People's Republic of China in corresponding Chinese Patent Application No. 201380049652.8.

* cited by examiner

RELATIONSHIP BETWEEN Co CONTENT AND CORROSION RATE CONSTANT OF VARIOUS Co-BASE ALLOYS

RELATIONSHIP BETWEEN Ni CONTENT AND CORROSION RATE
CONSTANT OF VARIOUS Co-BASE ALLOYS

COATING STRUCTURE MATERIAL

CROSS REFERENCE TO RELATED APPLICATIONS

This application is a National Stage of International Application No. PCT/JP2013/075769 filed Sep. 24, 2013, claiming priority based on Japanese Patent Application No. 2012-210214 filed Sep. 24, 2012, the contents of all of which are incorporated herein by reference in their entirety.

TECHNICAL FIELD

The present invention relates to a coating structure material excellent in Mg corrosion resistance, which is used for a cylinder of an Mg or Mg alloy injection molding machine and the like and has resistance to corrosion caused by molten Mg and molten Mg alloys.

BACKGROUND ART

Owing to advantages such as high working efficiency and capability of securing a good working environment, an injection molding machine has been widely applied to molding of Mg and Mg alloys. It is necessary for a cylinder component in the injection molding machine to have excellent high-temperature properties since it comes into contact with molten Mg alloys. Therefore, for the cylinder component, it has been proposed to use Ni-base heat-resistant alloys.

However, in general, since the Ni-based heat resistant alloys are severely corroded when they come into contact with molten Mg alloys, it is necessary to perform lining on the inner surface of the cylinder with a material excellent in corrosion resistance. It is said that a Co-base alloy is suitable as the lining material and, hitherto, some technologies for improving the corrosion resistance by lining a cylinder component for a light-metal injection molding machine with a Co-base alloy have been reported (PTLs 1 to 4).

For example, PTLs 1 and 2 disclose technologies for imparting the corrosion resistance by joining a coating layer such as a Co-based alloy to the inner surface of an Ni-base superalloy cylinder for a light-alloy injection molding machine by HIP method. Moreover, PTL 3 discloses a technology of forming a coating layer such as a Co-base alloy on the inner surface of a cylinder base material for a light-metal injection molding machine, which is composed of an austenite-based steel material, to improve the corrosion resistance. PTL 4 discloses a technology of constituting wide variety of high-temperature components such as a cylinder, a screw, and a screw head of a low-melting-point metal injection molding machine by an Ni-base heat-resistant alloy and further coating the components with a Co-base heat-resistant alloy.

CITATION LIST

Patent Literature

PTL 1: JP-A-2004-66241
PTL 2: JP-A-2004-66240
PTL 3: JP-A-2002-283030
PTL 4: Japanese Patent No. 2862799

SUMMARY OF INVENTION

Technical Problem

Incidentally, in recent years, in order to enhance a liquid fraction of molted Mg alloy as far as possible, it has been desired for the cylinder component to use an environment exceeding 650° C. Thus, in view of corrosion resistance, more severe requirements have been needed but conventional cylinder base materials have not been able to meet such requirements sufficiently.

The technologies shown in the above-described Patent Literatures do not positively control ingredient dilution which may occur between the cylinder base material and the Co-base alloy formed as a coating layer. For making the Co-base alloy exhibit excellent corrosion resistance as the coating layer, it is necessary to suppress fluctuations in the alloy ingredients but, in the case where the coating layer is formed on the inner surface of the cylinder substrate, the ingredient dilution from the substrate more or less occurs. In the case where the ingredient dilution is remarkable, the ingredients of the coating layer becomes different from the ingredients of the original Co-base alloy and there is a concern that the function of imparting the corrosion resistance may be lost.

In addition, for functioning as a highly reliable cylinder component, as a matter of course, excellent strength and structural stability at high temperature are necessary. Furthermore, it is also required to secure manufacturability as a cylinder component. Namely, there becomes necessary a component that possesses a coating layer having such corrosion resistance as described above, while satisfying required properties for high-temperature strength, structural stability, and manufacturability.

The present invention has been made for solving such circumstances and an object thereof is to provide a coating structure material excellent in Mg corrosion resistance, which has an ingredient dilution-suppressed Co-base alloy coating layer on a substrate composed of an Ni—Co-base alloy and has resistance to corrosion caused by molten Mg and molten Mg alloys. When such a component is developed, it is expected that a good corrosion resistance can be secured and excellent manufacturability, high-temperature strength, and structural stability as the cylinder component can be exhibited.

Solution to Problem

The present inventors have first investigated the influence of the ingredient dilution on the corrosion resistance of a Co-base alloy, specifically, the influence of the ingredient dilution by Ni on the corrosion resistance for the Co-base alloy layer applied on an Ni—Co-base superalloy. As a result, it has been found that the corrosion resistance is steeply lowered when the Ni content in the Co-base alloy exceeds 20% in terms of % by mass. Moreover, they have revealed that excellent corrosion resistance is obtained when the Co content in the Co-base alloy is 42% or more, and thus they have accomplished the invention.

Namely, the gist of the invention lies on the following <1> to <7>.

<1> A coating structure material comprising an Ni—Co-base alloy substrate and a Co-base alloy coating layer formed on the Ni—Co-base alloy substrate, wherein the Co-base alloy coating layer contains, in terms of % by mass, Ni: 20% or less, Co: 42% or more, Si: 2.8% or less, and Fe: 3.5% or less.

<2> The coating structure material according to <1>, wherein the Co-base alloy coating layer further contains at least one element selected from the group consisting of, in terms of % by mass, C: 1.5% or less, Mn: 1.0% or less, Cr:

30% or less, Mo: 20% or less, W: 9.0% or less, Ti: 0.3% or less, and Al: 0.4% or less, the remainder being unavoidable impurities.

<3> The coating structure material according to <1> or <2>, wherein the Ni—Co-base alloy contains, in terms of % by mass, C: 0.005 to 0.15%, Cr: 8 to 22%, Co: 5 to 30%, Mo: 1 to less than 9%, W: 5 to 20%, Al: 0.1 to 2.0%, and Ti: 0.3 to 2.5%, the remainder being Ni and unavoidable impurities.

<4> The coating structure material according to <3>, wherein the Ni—Co-base alloy further contains at least one element selected from the group consisting of in terms of % by mass, Si: 0.3% or less, B: 0.015% or less, Mg: 0.01% or less, Zr: 0.2% or less, and Hf: 0.8% or less.

<5> The coating structure material according to <3> or <4>, wherein the Ni—Co-base alloy further contains at least either of Nb and Ta in an amount of 1.5% or less in terms of % by mass, in terms of [Nb content (%)+0.5×Ta content (%)].

<6> The coating structure material according to any one of <1> to <5>, wherein the Co-base alloy coating layer is obtained by coating the Ni—Co-base alloy substrate with a Co-base alloy by build-up welding.

<7> The coating structure material according to any one of <1> to <6>, which is used for a component for a cylinder of an Mg or Mg alloy injection molding machine.

Advantageous Effects of Invention

According to the invention, an Ni—Co-base alloy substrate having heat resistance and an upper Co-base alloy coating layer having excellent corrosion resistance and suitable composition can afford good durability even against corrosion caused by high-temperature molten Mg or molten Mg alloys. Thus, when there is used a cylindrical component having an inner surface composed of the Co-base alloy coating layer portion of the coating structure material according to the invention, it is possible to suppress the corrosion caused by molten Mg on the cylinder inner surface remarkably.

When the coating structure material according to the invention is used for a component for a cylinder of an Mg or Mg alloy injection molding machine, it becomes possible to elevate the temperature at the cylinder portion and, as a result, the liquid fraction of the molten Mg alloy in the cylinder can be increased, molding efficiency can be enhanced, and Mg or Mg alloys can be satisfactorily injection-molded, so that it is expected that excellent manufacturability, high-temperature strength, and structural stability can be exhibited.

DESCRIPTION OF EMBODIMENTS

Figure 1:
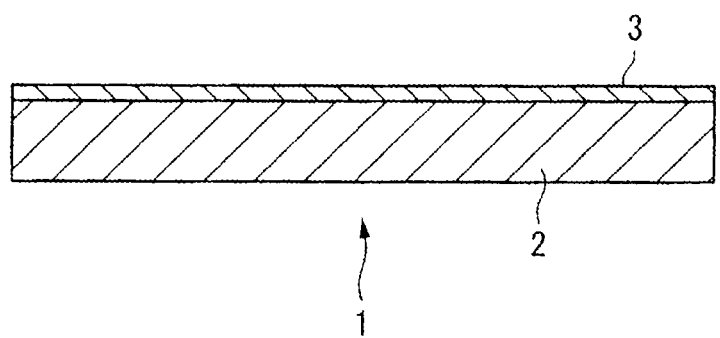
FIG. 1 is a cross-sectional view showing a part of the coating structure material of one illustrative embodiment of the invention.

The coating structure material according to the invention is a coating structure material comprising an Ni—Co-base alloy substrate and a Co-base alloy coating layer formed on the Ni—Co-base alloy substrate, wherein the Co-base alloy coating layer contains, in terms of % by mass, Ni: 20% or less, Co: 42% or more, Si: 2.8% or less, and Fe: 3.5% or less.

The following will explain reasons for limiting the composition of the Co-base alloy coating layer and the composition of the Ni—Co-base alloy substrate in order, which are defined in the invention. Incidentally, the contents of the following ingredients are all shown in terms of % by mass. Here, "% by weight" has the same meaning as "% by mass" and the case of simply describing as "%" indicates "% by weight".

(1) Composition of Co-Base Alloy Coating Layer

The composition of the Co-base alloy coating layer contains the following ingredients as essential ingredients and the other ingredients are not particularly limited. For example, the remainder may be unavoidable impurities or the composition may contain the other ingredients to be described below.

Ni: 20% or Less

Since Ni remarkably impairs the corrosion resistance to molten Mg when Ni exists in the coating layer, the Ni content in the coating layer is limited to 20% or less. Incidentally, in the Co-base alloy coating layer, there is dilution from the Ni—Co-base alloy substrate, so that Ni is unavoidably contained even in a minute case.

Co: 42% or More

Co is an essential element for imparting the corrosion resistance to molten Mg, and 42% or more of Co is necessary in the coating layer for imparting sufficient corrosion resistance. Preferably, the Co content in the coating layer is controlled to 45% or more. Moreover, from the standpoint of achieving both of cost reduction of the coating layer and securement of corrosion resistance, the upper limit is preferably 75%, more preferably 70%.

Si: 2.8% or Less

Si has an effect of promoting the formation of a surface protective film, and thereby, the corrosion resistance to Mg is improved. In order to obtain the effect, it is preferable to contain 0.5% or more of Si but, when Si is excessively contained, the thickness of the surface protective film is steeply increased and the corrosion resistance may be lowered by easy peeling of the film. Accordingly, Si is not necessarily contained and the upper limit is defined to 2.8%. For the same reason, the lower limit is more preferably 0.8% and the upper limit is preferably 1.5%, more preferably 1.2%.

Fe: 3.5% or Less

Fe enhances the stability of the surface protective film and improves the corrosion resistance when contained in a small amount. Fe is not necessarily contained but, in order to obtain the effect, it is preferable to contain it in an amount of 2.5% or more. However, when it is excessively contained, closely adhered interface becomes brittle by diffused Fe, so that the upper limit is defined to 3.5%. Preferably, the upper limit is controlled to 3.0%.

In the Co-base alloy coating layer, in addition, a small amount of one or more of C, Mn, Cr, Mo, W, Ti, and Al may be contained. Specifically, the layer preferably contains at least one element selected from the group consisting of C: 1.5% or less, Mn: 1.0% or less, Cr: 30% or less, Mo: 20% or less, W: 9.0% or less, Ti: 0.3% or less, and Al: 0.4% or less, the remainder being unavoidable impurities. These ingredients are ingredients generally known as addition elements for Co-base alloys. Incidentally, W is more preferably controlled to 6.0% or less.

The unavoidable impurities that are the remainder of the Co-base alloy coating layer mean minute elements originally contained in alloy raw materials and gas elements such as O and N, which are unavoidably mixed in at coating layer formation. The content thereof is preferably 0.01% or less from the standpoint of suppressing the formation of harmful precipitation phases such as intermetallic compounds.

(2) Composition of Ni—Co-Base Alloy Substrate

A suitable composition as the Ni—Co-base alloy substrate will be shown below.

C: 0.005 to 0.15%

C combines with various metal elements to form metal carbides. For example, Ti and C form TiC and Cr and Mo form $M_6C$, MC, and $M_{23}C_6$ type carbides when Cr and Mo are collectively represent as "M". These carbides suppress alloy crystal grain coarsening, and they improve high-temperature ductility in the case where precipitated at grain boundaries. In the case where C is not contained in an amount of 0.005% or more, the above effect is not obtained but, in the case where the content exceeds 0.15%, not only the Ti content necessary for precipitation strengthening decreases but also Cr carbides excessively precipitate at grain boundaries at aging, so that the grain boundaries become brittle. Therefore, the C content is limited to 0.005 to 0.15%. Incidentally, for the same reasons, it is desirable to control the lower limit to 0.01% and the upper limit to 0.08%.

Cr: 8 to 22%

Cr is an element necessary for enhancing oxidation resistance, erosion resistance, and strength. Moreover, Cr combines with C to form carbides, thereby enhancing high-temperature strength. In order to obtain the above effect, a content of 8% or more is necessary but, when the content is too large, destabilization of matrix is invited and the formation of harmful TCP phases such as σ phase and α-Cr is promoted, thereby resulting in adverse influences on ductility and toughness. Therefore, the Cr content is limited to 8 to 22%. Incidentally, for the same reasons, it is desirable to control the lower limit to 10% and the upper limit to 15%.

Co: 5 to 30%

Co has an effect of bringing partition coefficients of W, Al, Ti, Nb, and the like in the alloy close to 1 to improve a segregation property. In order to obtain the effect, a content of 5% or more is necessary but, when the content exceeds 30%, deterioration of forgeability and high-temperature structural stability is invited. Therefore, the Co content is limited to the range of 5 to 30%. Incidentally, for the same reasons, it is desirable to control the lower limit to 10% and the upper limit to 20%.

Mo: 1 to Less than 9%

Mo is effective as a solid-solution strengthening element that mainly forms a solid solution in the matrix to contribute strengthening of the matrix itself. Furthermore, since Mo forms a solid solution in a γ' phase to enhance the stability of the phase through replacement of Al sites thereof, Mo is effective for improving high-temperature strength of the alloy. When the Mo content is less than 1%, the above effect is not sufficiently obtained but, when the content is 9% or more, there precipitate harmful phases such as a μ phase, which impair high-temperature structural stability, so that the Mo content is limited to 1 to less than 9%. For the same reasons, it is desirable to control the lower limit to 3% and the upper limit to 8%.

W: 5 to 20%

W, like Mo, has a solid-solution strengthening function of the matrix and a function of forming a solid solution in the γ' phase to improve strength and structural stability at high temperature. When the content is appropriate, the above effect is obtained but, when the content is too large, hot-workability is impaired and/or α-W precipitates to lower the structural stability. Therefore, the W content is limited to 5 to 20%. For the same reasons, it is desirable to control the lower limit to 7% and the upper limit to 15%.

Al: 0.1 to 2.0%

Al combines with Ni to precipitate a γ' phase, thereby contributing precipitation strengthening of the alloy. When the Al content is less than 0.1%, sufficient precipitation strengthening cannot be obtained but, when the content is too large, the γ' phase aggregates to grain boundaries and is coarsened, thereby remarkably impairing mechanical properties at high temperature and also lowering hot-workability. Therefore, the Al content is limited to 0.1 to 2.0%. For the same reasons, it is desirable to control the lower limit to 0.5% and the upper limit to 1.5%.

Ti: 0.3 to 2.5%

Ti mainly forms an MC carbide to suppress alloy crystal grain coarsening and also, like Al, combines with Ni to precipitate a γ' phase, thereby contributing precipitation strengthening of the alloy. In order to obtain the above effect, a Ti content of 0.3% or more is necessary but, when Ti is excessively contained, the stability of the γ' phase at high temperature is lowered and further an η phase is formed to impair the strength, ductility, toughness, and high-temperature and long-term structural stability. Therefore, the Ti content is limited to the range of 0.3 to 2.5%. Moreover, for the same reasons, it is desirable to control the lower limit to 0.5% and the upper limit to 2.0%.

It is desirable that the Ni—Co-base alloy in the invention satisfies the above compositional ranges and the remainder is Ni and unavoidable impurities.

The Ni content is preferably from 20 to 80% from the standpoint of exhibiting the actions of the above elements effectively.

Moreover, the unavoidable impurities in the Ni—Co-base alloy mean minute elements originally contained in dissolution raw materials or gas elements such as O and N, which are unavoidably mixed in during dissolution. The content thereof is preferably 0.01% or less from the standpoint of securing good hot-ductility.

In addition, it is more preferable that the Ni—Co-base alloy further contains at least one element selected from the group consisting of Si: 0.3% or less, B: 0.015% or less, Mg: 0.01% or less, Zr: 0.2% or less, and Hf: 0.8% or less.

The following will describe these elements.

Si: 0.3% or Less

Si is added as a deoxidant at the time of alloy dissolution as desired. When the Si content is too large, the ductility of the alloy is lowered and also the segregation property is deteriorated. Therefore, the Si content is limited to 0.3% or less. For the same reasons, it is more desirable to control the content to less than 0.1% and it is further more desirable to control the content to less than 0.05%. Moreover, in order to exhibit the function of the deoxidant effectively, the lower limit is preferably 0.005%, more preferably 0.01%.

B: 0.015% or Less

B segregates at grain boundaries to contribute high-temperature properties, so that B is contained as desired. However, when the content is too large, borates are prone to form and grain boundary embrittlement is caused, so that the content of B to be contained as desired is controlled to 0.015% or less. Moreover, in order to obtain the above action sufficiently, the content is controlled to preferably 0.0005% or more, more preferably 0.01% or more.

Mg: 0.01% or Less

Mg mainly combines with S to form sulfides, thereby enhancing hot-workability, so that Mg is contained as desired. However, when the content is too large, the grain boundaries are embrittled to lower the hot-workability conversely, so that the Mg content is controlled to 0.01% or less. Incidentally, for sufficiently exhibiting the above effect, the lower limit of the Mg content is preferably controlled to 0.0005% or more.

Zr: 0.2% or Less

Zr has the same effect as B and segregates at grain boundaries to contribute high-temperature properties, so that B is contained as desired. However, when Zr is excessively contained, the hot-workability of the alloy is lowered, so that the content of Zr to be contained as desired is controlled to 0.2% or less. For sufficiently obtaining the above effect, the content is controlled to preferably 0.001% or more, more preferably 0.002% or more. For the same reason, the upper limit is preferably controlled to 0.08%.

Hf: 0.8% or Less

Hf, like Zr, segregates at grain boundaries to contribute high-temperature properties, so that it is contained as desired. However, when Hf is excessively contained, the hot-workability of the alloy is lowered, so that the content of Hf to be contained as desired is controlled to 0.8% or less. For obtaining the above effect, Hf is contained in an amount of preferably 0.05% or more, more preferably 0.1% or more. For the same reason, the upper limit is preferably controlled to 0.5%.

In addition to the above, it is further preferable that the Ni—Co-base alloy in the invention contains at least either of Nb and Ta and the content is controlled to 1.5% or less in terms of [Nb content (%)+0.5×Ta content (%)].

(Nb+0.5Ta)≤1.5%

Nb and Ta are precipitation strengthening elements like Ai and Ti and are contained as desired since they precipitate a γ″ phase to strengthen the alloy. However, when they are excessively contained, Laves phase and σ phase are precipitated and the structural stability is remarkably impaired, so that the content of Nb and Ta is controlled to 1.5% or less as a value of (Nb+0.5Ta). Moreover, for the same reason as above, the value of (Nb+0.5Ta) is further preferably controlled to 1.0% or less. Furthermore, for exhibiting the above effect, the value of (Nb+0.5Ta) is preferably 0.1% or more and is more preferably controlled to 0.2% or more.

A method of forming the Co-base alloy coating layer on the Ni—Co-base alloy substrate is not particularly limited in the invention but the Co-base alloy coating layer having the above composition can be formed by performing build-up welding of a Co-base alloy having a suitable composition on the surface of the Ni—Co-base alloy having the above composition. In this case, the conditions for the build-up welding can be adjusted within the range of usual methods but it is necessary to set the composition of the Ni—Co-base alloy substrate, the composition of the Co-base alloy, and the conditions for the build-up welding appropriately. When these conditions are not appropriately set, the Co-base alloy coating layer of the invention is not obtained. Incidentally, as the above Co-base alloy, Stellite (registered trademark) can be used.

The following will describe one illustrative embodiment of the invention.

As mentioned previously, the Ni—Co-base alloy preferably contains, in terms of % by mass, C: 0.005 to 0.15%, Cr: 8 to 22%, Co: 5 to 30%, Mo: 1 to less than 9%, W: 5 to 20%, Al: 0.1 to 2.0%, and Ti: 0.3 to 2.5%, further contains at least one element selected from the group consisting of Si: 0.3% or less, B: 0.015% or less, Mg: 0.01% or less, Zr: 0.2% or less, and Hf: 0.8% or less as desired, and further contains at least either of Nb and Ta in an amount of 1.5% or less in terms of [Nb content (%)+0.5×Ta content (%)] as desired, the remainder being Ni and unavoidable impurities.

These Ni—Co-base alloy substrates can be produced by usual methods and are processed into a predetermined shape by plastic working or the like as needed. In the case where the substrate is used as a component for a cylinder of an Mg or Mg alloy injection molding machine, it is produced in a cylindrical form.

Moreover, the Co-base alloy coating layer for coating the above Ni—Co-base alloy substrate can be formed by known methods. Representatively, build-up welding, centrifugal casting welding, and the like can be adopted and the method is not limited to a specific method in the invention.

For example, using a Co-base alloy having a suitable composition (e.g., a prescribed composition of Stellite (registered trademark)) as a welding material, a Co-base alloy coating layer 3 is formed on an Ni—Co-base alloy substrate 2 as shown in FIG. 1 through build-up welding by TIG (tungsten inert gas) welding method or the like.

The welding conditions on this occasion can be selected within known condition ranges. For example, a current value, a voltage value, a plasma gas flow rate, and the like can be regulated. As a result, a Co-base alloy coating layer containing Ni: 20% or less, Co: 42% or more, Si: 2.8% or less, and Fe: 3.5% or less in terms of % by mass can be obtained. As for the composition, a coating structure material 1 having the Co-base alloy coating layer 3 having a composition falling within the range of the invention is obtained by appropriately combining the composition of the Ni—Co-base alloy substrate, the composition of the Co-base alloy to be the welding material, and the welding conditions. Incidentally, the thickness of the Co-base alloy coating layer 3 is not particularly limited in the invention but is preferably controlled to the range of about 3 to 5 mm.

The above-described coating structure material can be applied as a cylinder of an Mg or Mg alloy injection molding machine excellent in Mg corrosion resistance by forming it into a structure having a cylindrical shape and having the Co-base alloy coating layer 3 on the inner peripheral surface.

EXAMPLES

The following will describe Examples of the invention.

On the assumption of Co-base alloy coating layers, test materials of Co-base alloys shown in Table 1 (remainder being the other unavoidable impurities) were prepared and a corrosion test was performed. The procedure of the corrosion test is as follows.

After a crucible filled with AZ91D alloy that is a representative Mg alloy was first placed in a tightly closed vessel, the vessel was heated to a predetermined temperature while introducing an $SF_6$ mixed gas into the inside of the tightly closed vessel for the purpose of preventing evaporation. After the alloy in the crucible was melted, a test specimen was immersed in the molten alloy. During the immersion, the test specimen was rotated at a rotation number of 5 rpm for 1 minute every hour. After immersed for a predetermined time, the test specimen was pull up from the molten alloy and cooled to room temperature in the tightly closed vessel and then the test specimen was taken out. Subsequently, the test specimen was dipped in a 10% aqueous hydrochloric acid solution to remove the AZ91D alloy attached to the surface. Thereafter, weight of the test specimen was measured, mass decrease was determined from a difference from the weight before test, and the mass decrease was divided by the surface area of the test specimen to obtain a corrosion loss ($mg/cm^2$). The corrosion rate constant was calculated as a slope of a straight line obtained when the corrosion loss was plotted with respect to a square root of the immersion time. A smaller corrosion rate constant means more excellent corrosion resistance.

Table 1 collectively shows compositions (% by mass) and corrosion rate constants of various Co-base alloys.

TABLE 1

| Alloy system | Sign | Fe | C | Si | Mn | Ni | Cr | Mo | V | Co | W | Ti | Al | Nb | B | N | AZ91D-650° C. Corrosion rate constant (mg/cm$^2$/h$^{0.5}$) |
|---|---|---|---|---|---|---|---|---|---|---|---|---|---|---|---|---|---|
| Co-base | alloy A | 2.90 | 1.10 | 1.00 | 1.00 | 3.00 | 28.00 | 1.00 | 0.00 | 57.90 | 4.00 | 0.00 | 0.00 | 0.00 | 0.0000 | 0.0000 | 0.25 |
| | alloy B | 3.00 | 1.40 | 1.40 | 1.00 | 3.00 | 29.00 | 1.00 | 0.00 | 52.20 | 8.00 | 0.00 | 0.00 | 0.00 | 0.0000 | 0.0000 | 0.32 |
| | alloy C | 0.00 | 0.00 | 0.00 | 0.00 | 0.00 | 0.00 | 0.00 | 0.00 | 100.00 | 0.00 | 0.00 | 0.00 | 0.00 | 0.0000 | 0.0000 | 0.43 |
| | alloy D | 3.00 | 1.00 | 2.80 | 0.40 | 13.00 | 19.00 | 0.00 | 0.00 | 50.00 | 9.00 | 0.00 | 0.00 | 0.00 | 1.8000 | 0.0000 | 0.58 |
| | alloy E | 0.00 | 0.80 | 1.50 | 0.00 | 27.30 | 18.50 | 6.00 | 0.00 | 39.70 | 0.00 | 0.00 | 0.00 | 0.00 | 3.2000 | 0.0000 | 3.43 |
| | alloy F | 0.00 | 0.20 | 1.30 | 0.90 | 42.00 | 7.50 | 0.00 | 0.00 | 44.00 | 0.00 | 0.00 | 0.00 | 0.00 | 3.5000 | 0.0000 | 71.30 |

Figure 2:
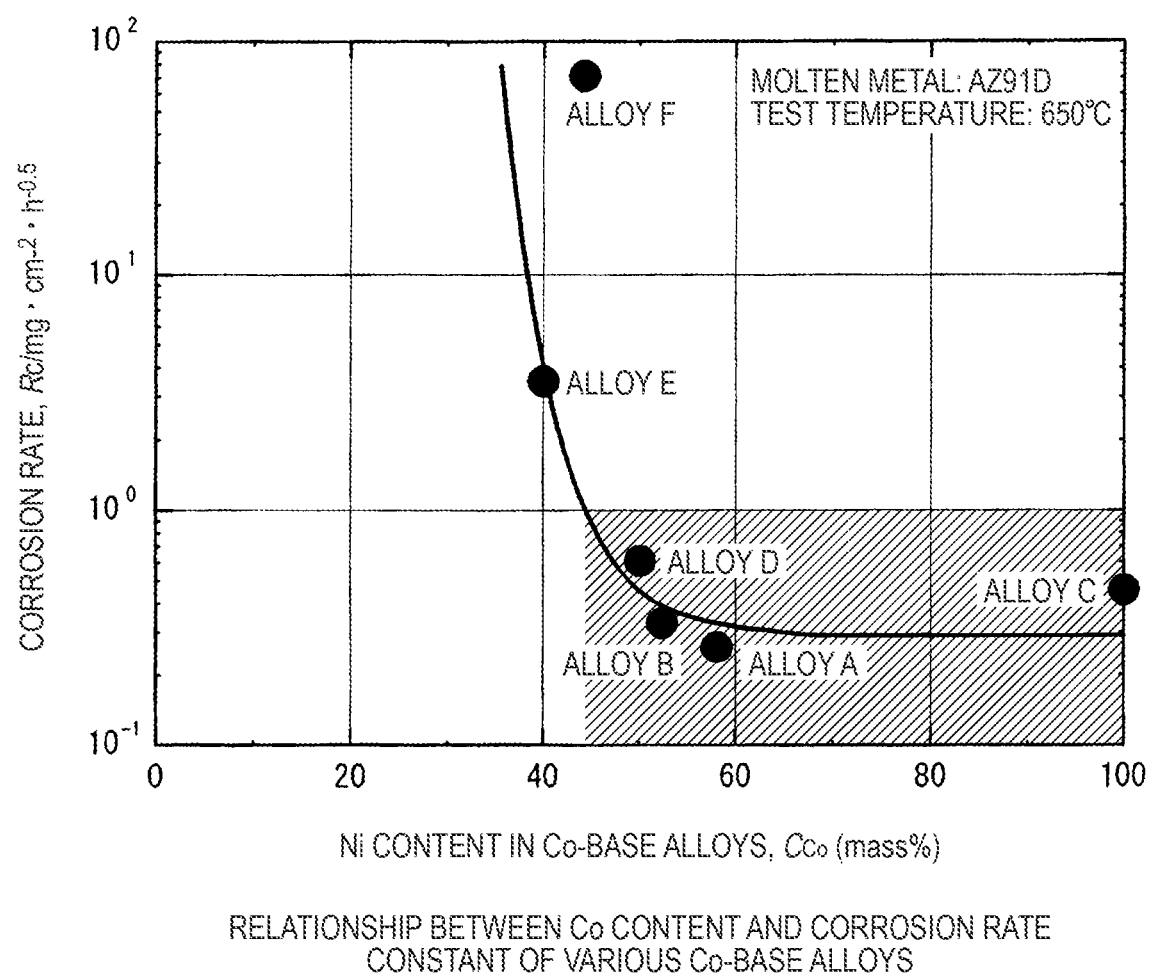
FIG. 2 is a graph showing a relationship between Co content and corrosion rate constant for various Co-base alloys shown in Table 1.

FIG. 2 shows a relationship between Co content and corrosion rate constant for various Co-base alloys shown in Table 1. Also, FIG. 3 shows a relationship between Ni content and corrosion rate constant for various Co-base alloys.

From FIG. 2, it was realized that the corrosion rate constant decreased as the Co content in the Co-base alloy increased. In particular, as shown by the hatched part, it was found that, when the Co content exceeds 42%, the corrosion rate constant decreased to 1 mg/(cm$^2$·h$^{0.5}$) or less and became almost constant regardless of the Co content.

Figure 3:
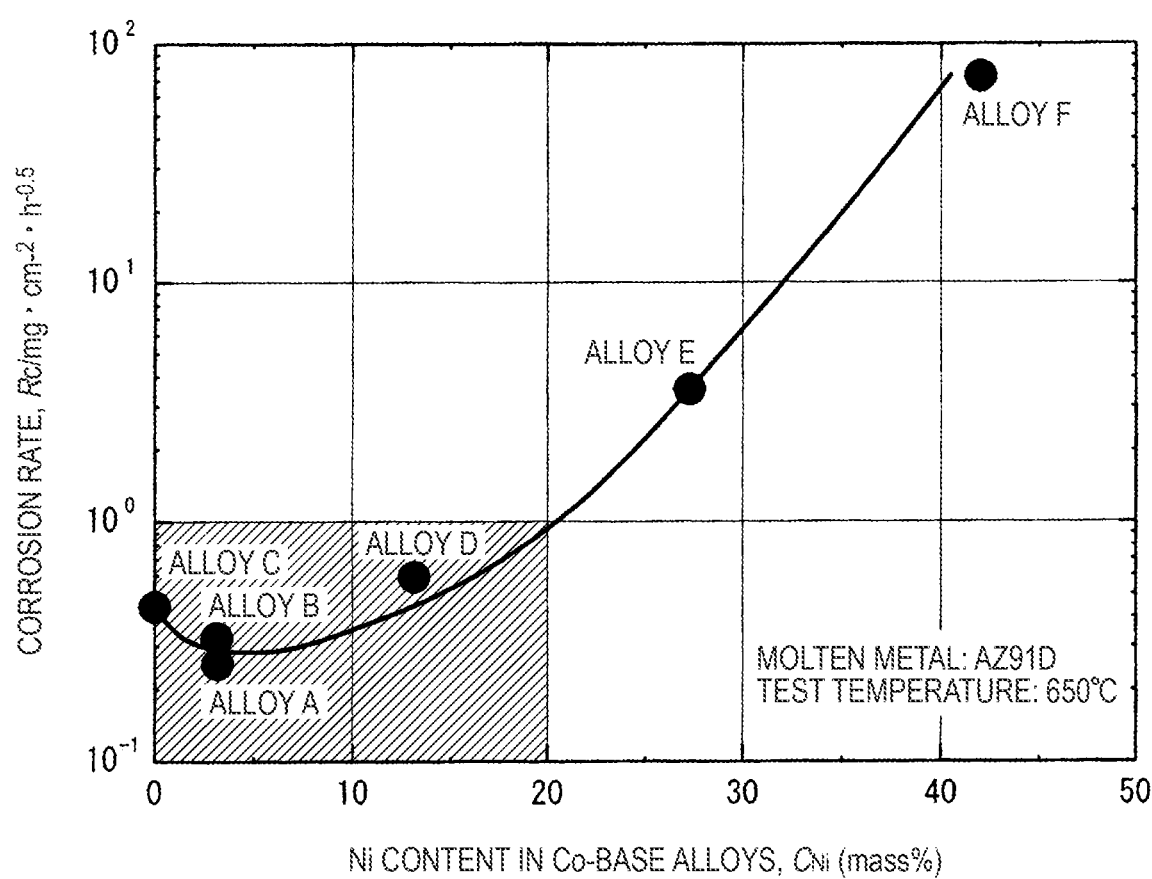
FIG. 3 is a graph showing a relationship between Ni content and corrosion rate constant for various Co-base alloys shown in Table 1.

Also, from FIG. 3, it was realized that the corrosion rate constant increased as the Ni content in the Co-base alloy increased. In particular, as in the hatched part, it was revealed that the corrosion rate constant was 1 mg/(cm$^2$·h$^{0.5}$) or less and was very small until the Ni content reached 20% but, when the content exceeded 20%, the corrosion rate constant steeply increased.

From the above results, there were obtained findings that it is necessary to increase the Co content in the Co-base alloy and also it is necessary to decrease the Ni content in order to impart the corrosion resistance to molten Mg alloys.

In view of the above findings, the corrosion resistance was evaluated for two kinds of inventive materials and a comparative material, compositions (% by mass, the remainder being the other unavoidable impurities) thereof being shown in Table 2. The inventive materials and the comparative material were obtained by making a Co-base alloy coating layer (represented as Co-base coating layer in the table) on an Ni—Co-base alloy substrate (represented as Ni—Co-base substrate in the table) in Table 2 by build-up welding. On that occasion, an Ni dilution amount from the substrate at the time of formation of the Co-base coating layer was controlled by regulating the current, voltage, pre-heating conditions, and the like at the time of the build-up welding within the ranges of usual methods, thereby mainly changing the Ni content and the Co content in the Co-base coating layer.

Here, the conditions for the build-up welding were regulated as follows within the ranges of usual methods: Current: 120 to 150 A, Voltage: 30 to 32 V, Pre-heating temperature: 250 to 300° C., and Plasma gas flow rate: 1.0 to 2.0 L/minute. The corrosion rate constant was calculated in the same manner as described above.

TABLE 2

| | | C | Si | Mn | Ni | Cr | Mo | V | Co | W | Ti | Al | Nb | B | Fe |
|---|---|---|---|---|---|---|---|---|---|---|---|---|---|---|---|
| Inventive material (K41) | Co-base coating layer | 1.07 | 0.97 | 0.97 | 4.60 | 27.52 | 1.09 | 0.00 | 56.61 | 4.18 | 0.02 | 0.04 | 0.01 | 0.0001 | 2.81 |
| | Ni—Co-base substrate | 0.04 | 0.01 | 0.01 | 56.37 | 11.90 | 4.00 | 0.01 | 14.87 | 10.11 | 0.79 | 1.17 | 0.48 | 0.0043 | — |
| Inventive material (K21) | Co-base coating layer | 0.80 | 0.72 | 0.72 | 17.94 | 23.49 | 1.84 | 0.00 | 45.85 | 5.71 | 0.22 | 0.33 | 0.13 | 0.0012 | 1.89 |
| | Ni—Co-base substrate | 0.04 | 0.01 | 0.01 | 56.37 | 11.90 | 4.00 | 0.01 | 14.87 | 10.11 | 0.79 | 1.17 | 0.48 | 0.0043 | — |
| Comparative material (K11) | Co-base coating layer | 0.73 | 0.65 | 0.65 | 21.68 | 22.37 | 2.05 | 0.00 | 42.84 | 6.14 | 0.28 | 0.41 | 0.17 | 0.0015 | 2.09 |
| | Ni—Co-base substrate | 0.04 | 0.01 | 0.01 | 56.37 | 11.90 | 4.00 | 0.01 | 14.87 | 10.11 | 0.79 | 1.17 | 0.48 | 0.0043 | — |

Figure 4:
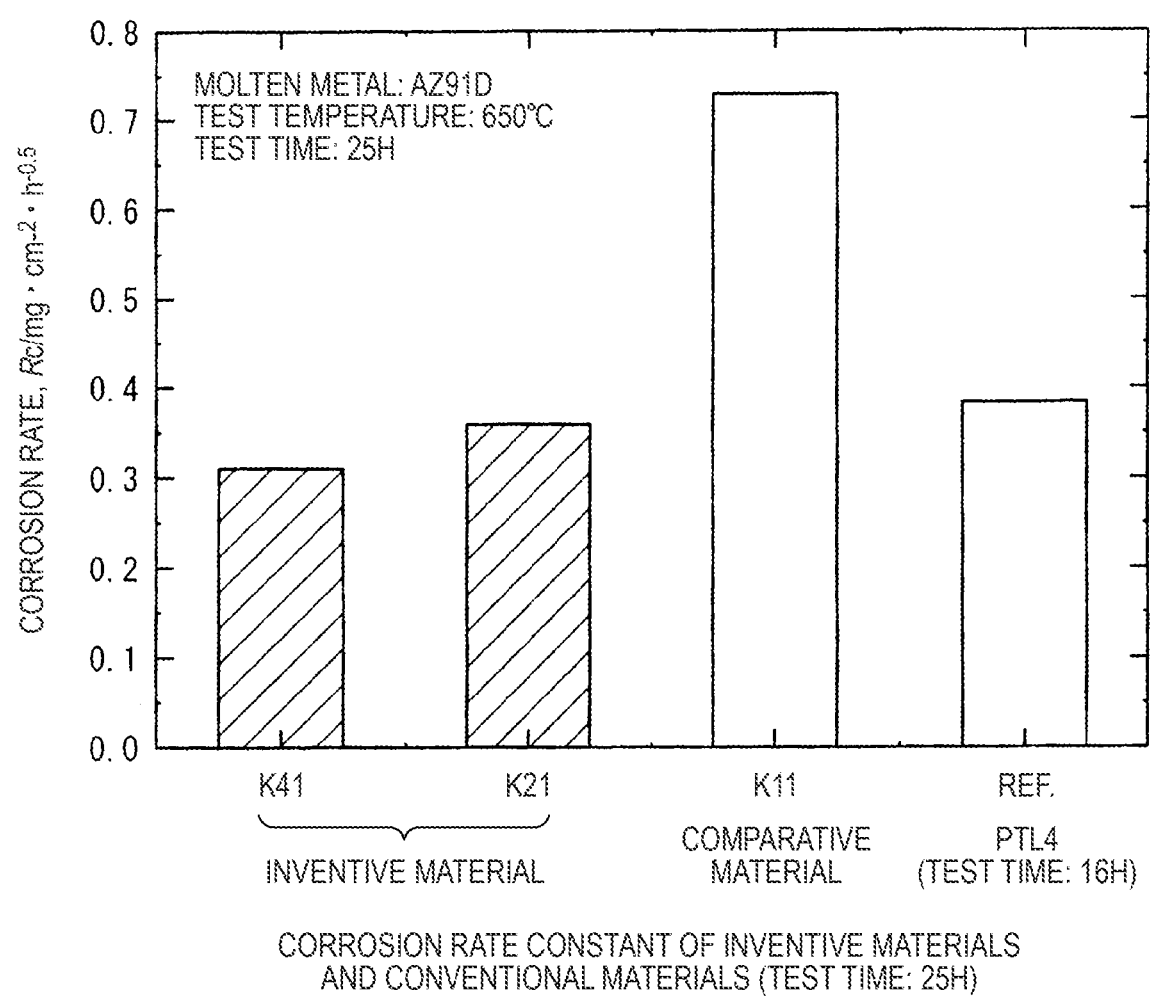
FIG. 4 shows corrosion rate constants of inventive materials and comparative material at test time of 25 hours (including data of PTL 4).

FIG. 4 shows a corrosion rate constant of each evaluated material at a test time of 25 hours. Incidentally, in FIG. 4, there was also mentioned a corrosion rate constant of a material obtained by coating an Ni-base heat-resistant alloy with Stellite (registered trademark), the material being disclosed in PTL 4, at a test temperature of 650° C. at a test time of 16 hours. Since the corrosion rate constants of the inventive materials are smaller than that of the comparative material at any test time and are smaller than that of the conventional material shown in PTL 4, it is shown that the inventive materials have excellent corrosion resistance.

In PTL 4, Inconel 718 or the like is used as an Ni-base alloy as the substrate and a corrosion property is evaluated after lining it with Stellite (registered trademark) by a usual method but the inventive materials show smaller corrosion rate constants than that of PTL 4. This fact indicates that, in order to decrease the corrosion rate constant, it is necessary that the Ni—Co-base alloy of the inventive materials should be used as a substrate and the Co-base alloy coating layers of the inventive materials should be formed by a further adjusted method among usual methods.

While the invention has been described in detail and with reference to specific embodiments thereof, it will be apparent to one skilled in the art that various changes and modifications can be made therein without departing from the spirit and scope thereof. The present application is base on Japanese Patent Application No. 2012-210214 filed on Sep. 24, 2012, and the contents are incorporated herein by reference.

REFERENCE SIGNS LIST

1: Coating structure material
2: Ni—Co-base alloy substrate
3: Co-base alloy coating layer

The invention claimed is:
1. A coating structure material comprising an Ni—Co-base alloy substrate and a Co-base alloy coating layer, which is to come into contact with molten Mg or molten Mg alloy, formed on the Ni—Co-base alloy substrate, wherein the Co-base alloy coating layer contains, in terms of % by mass, Ni: 20% or less, Co: 42% or more, Si: 0.5 to 2.8%, C: 0.8 to 1.5%, and Fe: 2.5 to 3.5%, and the Ni—Co-base alloy contains, in terms of % by mass, Cr: 10 to 15%.

2. The coating structure material according to claim 1, wherein the Co-base alloy coating layer further contains at least one element selected from the group consisting of, in terms of % by mass, Mn: 1.0% or less, Cr: 30% or less, Mo: 20% or less, W: 9.0% or less, Ti: 0.3% or less, and Al: 0.4% or less, the remainder being unavoidable impurities.

3. The coating structure material according to claim 1, wherein the Ni—Co-base alloy further contains, in terms of % by mass, C: 0.005 to 0.15%, Co: 5 to 30%, Mo: 1 to less than 9%, W: 5 to 20%, Al: 0.1 to 2.0%, and Ti: 0.3 to 2.5%, the remainder being Ni and unavoidable impurities.

4. The coating structure material according to claim 3, wherein the Ni—Co-base alloy further contains at least one element selected from the group consisting of, in terms of % by mass, Si: 0.3% or less, B: 0.015% or less, Mg: 0.01% or less, Zr: 0.2% or less, and Hf: 0.8% or less.

5. The coating structure material according to claim 3, wherein the Ni—Co-base alloy further contains at least either of Nb and Ta in an amount of 1.5% or less in terms of % by mass, in terms of [Nb content (%)+0.5×Ta content (%)].

6. The coating structure material according to claim 1, wherein the Co-base alloy coating layer is obtained by coating the Ni—Co-base alloy substrate with a Co-base alloy by build-up welding.

7. The coating structure material according to claim 1, which is used for a component for a cylinder of an Mg or Mg alloy injection molding machine.

* * * * *